UNITED STATES PATENT OFFICE.

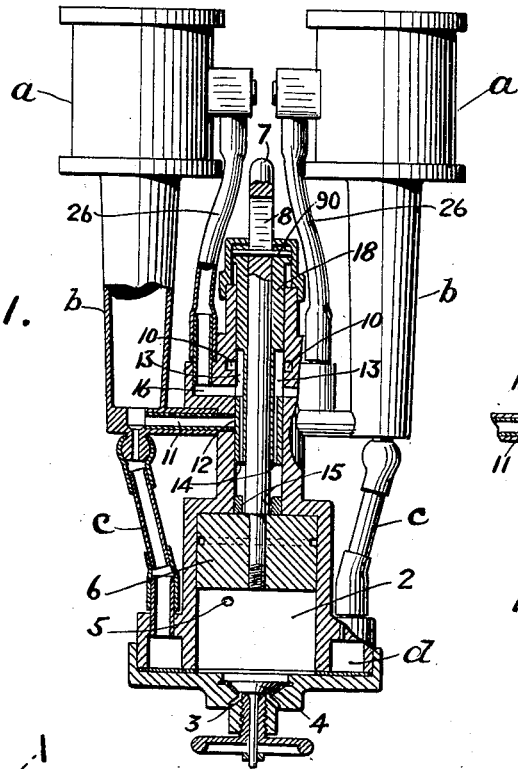
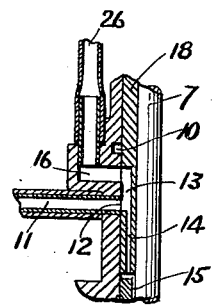
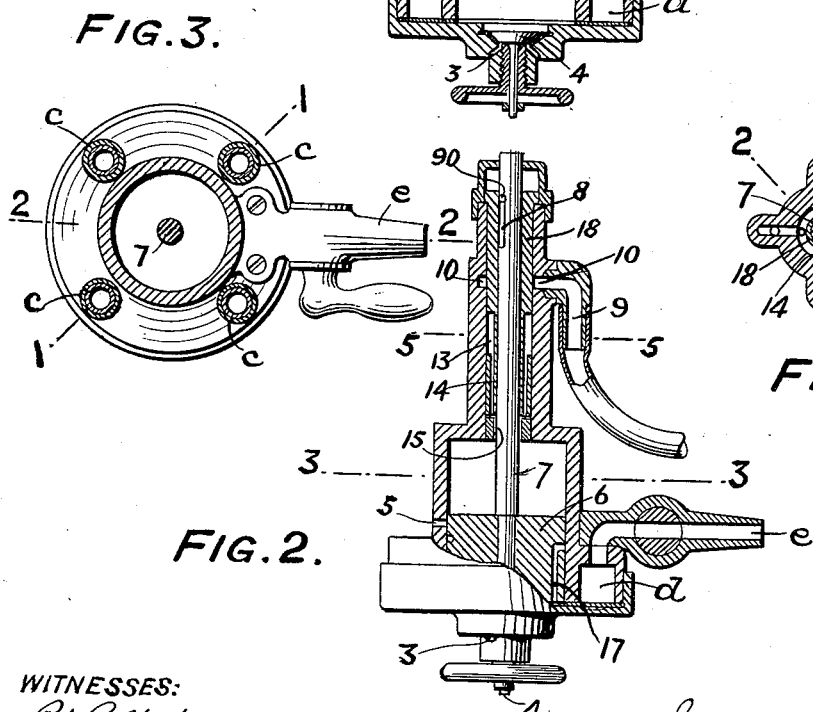
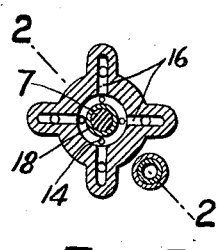

JOHN L. HULBERT, OF POUGHKEEPSIE, NEW YORK, ASSIGNOR TO THE DE LAVAL SEPARATOR COMPANY, A CORPORATION OF NEW JERSEY.

MILKING-MACHINE.

1,070,135.  Specification of Letters Patent.  Patented Aug. 12, 1913.

Application filed June 30, 1911. Serial No. 636,145.

*To all whom it may concern:*

Be it known that I, JOHN L. HULBERT, a citizen of the United States, residing at Poughkeepsie, county of Dutchess, and State of New York, have invented a new and useful Improvement in Milking-Machines, of which the following is a full, clear, and exact description, reference being had to the accompanying drawings, which form a part of this specification.

My invention relates to certain improvements in milking machines whereby their effectiveness is increased.

I will first describe the embodiment of my invention shown in the accompanying drawings, and then point out the invention in the claims.

Figure 6:
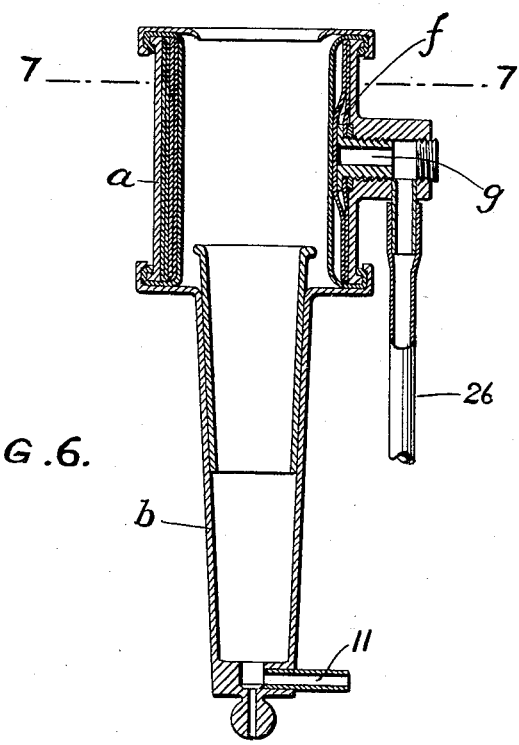
Figure 7:
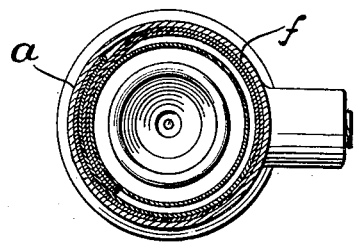

In the drawings: Figure 1 is a view, partially in section, of an apparatus involving my invention, taken on the line 1—1, Fig. 3. Fig. 2 is a sectional view of a part of Fig. 1 taken on the line 2—2 Figs. 3 and 5; Fig. 3 is a section on the line 3—3, Fig. 2; Fig. 4 is a view of part of apparatus of Fig. 1; Fig. 5 is a section on line 5—5; Fig. 2; Fig. 6 is an enlarged detail sectional view of a portion of Fig. 1; Fig. 7 is a section on line 7—7, Fig. 6.

*a* are the teat cups proper having the conical extensions *b* surrounding the discharge portion of the teat connected with a flexible pipe *c* leading to the milk receiving chamber *d*.

*e* is the outlet from the milk receiving chamber leading to the milk receptacle, not shown. This pipe *e* is constantly under suction, producing a partial vacuum in the milk receiving chamber, the pipe connection between the conical ends of the teat cups and the milk receiving chamber, and in the conical ends of the teat cups. The teat cups have linings forming between them and the wall of the cup *a* a cushion chamber in which are the inflatable cushions.

*g* are inlets to these cushions connected by flexible pipes 26 with the passage 16 in the valve casing.

11 is a passage leading from the valve casing to the conical discharge portion of the teat cup. Intermittently air is admitted to the teat cup proper inflating the cushions, and exhausted from the teat cup proper to the conical extension of the teat cup. This I accomplish in the following manner: 2 is a chamber having the port 3 controlled by the inwardly opening valve 4 and also having the exhaust port 5. In this chamber is the piston 6 connected to the rod 7. This piston has a slot 8 through which passes a pin 90 connected to the valve proper 18. 9 is the pressure inlet leading from a source of pressure supply, not shown, and terminating in the annular chamber 10. 11 is a passage leading from the port 12 to the conical lower portion *b* of the teat cups. 13 is a passage in the valve proper 18. 14 is a passage in the valve proper 18, and 15 is a constricted space between the piston rod and its bushing. 16 are passages in the valve casing connecting through tube 26 with the cushion chambers of the teat cups *a*.

In the position shown in Fig. 1, the pressure supply is connected with the pipe leading to the cushion chambers of the teat cups and also to top of piston 6. When the pressure is sufficient on top of piston 6 to move it, it and its rod 7 descend. After moving the length of the slot 8 they carry the valve 18 with them. This downward movement is retarded by the compression of air below the piston 6 until passage 17 connects with port 5 and allows the air to escape. The piston then makes a quick downward movement carrying the valve 18 past the lap position. The passage 13 connects 16 and 11 (see Fig. 4), and the air in the inflatable cushion chamber exhausts into the conical discharge portions of the teat cups. The upper portion of chamber 2 above the piston 6 through passages 14, 15 and 11 is connected with the conical discharge portion of the teat cups, and it being constantly under suction, the air in said portion of the chamber exhausts therethrough. When the air above the piston is exhausted, the valve is allowed to lift, admitting air through the ports 3, and the piston is lifted. The first upward movement of the piston is a free movement of the rod 7, which, at the end of its free movement, cuts off the connection of passages 13 and 14 with passages 11 and connects the pressure supply with passage 14, which admits air below the valve quickly, lifting the valve by the air, and admits air slowly to the top of piston. Air pressure is also admitted through passage 16 to the cushion chambers. The admission of air rapidly below the valve and slowly above the piston, enables the valve to be rapidly raised to its ultimate position, while the pressure above the piston is slowly accumulating to a point sufficient to cause the piston to descend.

In an application filed of even date herewith, Serial No. 636,144, I have described and illustrated the machine herein described and illustrated and also a machine of a different specific construction and have therein laid broad claims to the invention common to both machines, the claims in this case being confined to features specific to the machine herein described and illustrated. Nor do I herein claim the method herein described, as the same forms the subject matter of Letters Patent issued to me October 29, 1912, No. 1,043,013, the application for which is a division of said application Serial No. 636,144.

Having now fully described my invention, what I claim and desire to protect by Letters Patent is:

1. In a milking machine, in combination, a teat cup having an upper portion containing an inflatable cushion, and a lower portion adapted to surround the milk discharge portion of the teat, means to intermittently admit pressure to the inflatable cushion chamber, and to exhaust therefrom to the lower portion of the teat cup.

2. In a milking machine, in combination, a teat cup having an upper portion containing an inflatable cushion, and a lower portion adapted to surround the milk discharge portion of the teat, means to intermittently admit pressure to the inflatable cushion chamber and to exhaust therefrom to the lower portion of the teat cup, and means to maintain suction on the lower portion of the teat cup.

3. In a milking machine, in combination, a teat cup having an upper portion containing an inflatable cushion and a lower portion adapted to surround the milk discharge portion of the teat, a valve and valve chamber, there being a passage to the valve casing from a source of pressure supply, and passages leading respectively to the inflatable cushion chamber, and lower portion of the teat cup, the valve in its movement alternately connecting the passage to the inflatable chamber with the source of pressure supply and with the passage to the lower portion of the teat cup.

4. In a milking machine, in combination, a teat cup having an upper portion containing an inflatable cushion and a lower portion adapted to surround the milk discharge portion of the teat, a valve and valve chamber, there being a passage to the valve casing from a source of pressure supply, and passages leading respectively to the inflatable cushion chamber and lower portion of the teat cup, the valve in its movement alternately connecting the passage to the inflatable chamber with the source of pressure supply and with the passage to the lower portion of the teat cup, and means to maintain suction on the lower portion of the teat cup.

5. The combination with the teat cup, having the inflatable cushion and the lower portion surrounding the discharge portion of the teat, the valve casing and passages leading respectively from the cushion chamber and lower portion of teat cup, and from a source of pressure supply to the valve casing, of a valve, there being a passage in said valve leading to the space below the valve, the valve in its movement connecting alternately the passage to the inflatable chamber with the pressure supply and with the lower portion of teat cup, and connecting the pressure supply passage with the lower portion of valve, and means to initially move said valve.

6. The combination with the teat cup, having the inflatable cushion and the lower portion surrounding the discharge portion of the teat, the valve casing and passages leading respectively from the cushion chamber and lower portion of teat cup, and from a source of pressure supply to the valve casing, of a valve comprising a valve proper and piston and rod, slot and pin connection between the piston rod and valve proper, a chamber in which the piston travels, means in the movement of the valve proper to admit pressure to the top of the piston and exhaust pressure therefrom, said means including a passage in said valve leading to the lower portion of the valve, the valve in its movement connecting alternately the passage to the inflatable chamber with the pressure supply and with the lower portion of teat cup and connecting the pressure supply passage with the lower portion of valve.

7. The combination with the teat cup, having the inflatable cushion and the lower portion surrounding the discharge portion of the teat, the valve casing and passages leading respectively from the cushion chamber and lower portion of teat cup, and a source of pressure supply to the valve casing, of a valve comprising a valve proper and a piston and rod, slot and pin connection between the piston rod and valve proper, a chamber in which the piston travels, a constricted passage leading in one position of the valve from the pressure passage to the top of the piston, and in the other position connecting the top of the piston with said passage from the lower portion of the teat cup, the valve in its movement connecting alternately the passage to the inflatable chamber with the pressure supply and with the passage to the lower portion of teat cup.

In testimony of which invention, I have hereunto set my hand, at Philadelphia, on this 28th day of June, 1911.

JOHN L. HULBERT.

Witnesses:
M. M. HAMILTON,
E. E. WALL.

Copies of this patent may be obtained for five cents each, by addressing the "Commissioner of Patents, Washington, D. C."